(12) United States Patent
Cooney et al.

(10) Patent No.: US 9,535,844 B1
(45) Date of Patent: Jan. 3, 2017

(54) PRIORITIZATION FOR CACHE SYSTEMS

(71) Applicant: EMC Corporation, Hopkinton, MA (US)

(72) Inventors: Michael J. Cooney, Mendon, MA (US); Marcela S. Boboila, Brookline, MA (US); Guido A. DiPietro, Sterling, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 14/319,440

(22) Filed: Jun. 30, 2014

(51) Int. Cl.
*G06F 12/00* (2006.01)
*G06F 13/00* (2006.01)
*G06F 13/28* (2006.01)
*G06F 12/08* (2016.01)

(52) U.S. Cl.
CPC ..... *G06F 12/0866* (2013.01); *G06F 2212/281* (2013.01)

(58) Field of Classification Search
CPC .. G06F 12/08; G06F 12/0802; G06F 12/0804; G06F 12/0806; G06F 12/0808; G06F 12/0811; G06F 12/0815; G06F 12/0817; G06F 12/082; G06F 12/0822; G06F 12/0824; G06F 12/0826; G06F 12/0828; G06F 12/0831; G06F 12/0833; G06F 12/0835; G06F 12/084; G06F 12/0842; G06F 12/0844; G06F 12/0846; G06F 12/0848; G06F 12/0862; G06F 12/0864; G06F 12/0866; G06F 12/0868; G06F 12/0871; G06F 12/0873; G06F 12/0875; G06F 12/0893; G06F 12/0895; G06F 12/0897; G06F 17/30; G06F 2003/0691; G06F 2212/27; G06F 2212/271;G06F 2212/272; G06F 2212/28; G06F 2212/281; G06F 2212/282; G06F 2212/283; G06F 2212/284; G06F 2212/285; G06F 2212/286
USPC ........................................................ 711/118
See application file for complete search history.

(56) References Cited

U.S. PATENT DOCUMENTS

| | | | | |
|---|---|---|---|---|
| 4,429,363 A | * | 1/1984 | Duke | .................. G06F 12/0866 711/122 |
| 5,276,867 A | * | 1/1994 | Kenley | .................... G06F 12/08 |
| 5,386,547 A | | 1/1995 | Jouppi | |
| 5,440,686 A | * | 8/1995 | Dahman | ............... G06F 12/121 345/537 |
| 5,564,035 A | | 10/1996 | Lai | |

(Continued)

OTHER PUBLICATIONS

Definition of Logical Unit Number (LUN); Techopedia; Jan. 13, 2012; retrieved from https://web.archive.org/web/20120113025245/http://www.techopedia.com/definition/321/logical-unit-number-lun on Dec. 4, 2015 (2 pages).*

(Continued)

*Primary Examiner* — Daniel C Chappell
(74) *Attorney, Agent, or Firm* — Daly, Crowley, Mofford & Durkee, LLP (57) ABSTRACT

In a data storage environment, a caching system includes a synchronous I/O module to stage cache promotions, and an asynchronous I/O module to de-stage cache promotions. To reduce the likelihood that high priority cache promotions are not skipped, the caching system associations a configurable priority level with each logical storage device, and prioritizes cache promotions accordingly. Related methods are also described.

17 Claims, 7 Drawing Sheets

(56) References Cited

U.S. PATENT DOCUMENTS

| | | | | |
|---|---|---|---|---|
| 5,664,153 | A * | 9/1997 | Farrell | G06F 12/0215 711/104 |
| 5,809,560 | A * | 9/1998 | Schneider | G06F 12/0862 711/202 |
| 6,205,528 | B1 | 3/2001 | Kingsbury et al. | |
| 6,487,562 | B1 * | 11/2002 | Mason, Jr. | G06F 3/0605 |
| 6,618,793 | B2 | 9/2003 | Rozario et al. | |
| 6,629,200 | B1 | 9/2003 | Kanamaru et al. | |
| 6,633,954 | B1 * | 10/2003 | Don | G06F 3/0601 711/114 |
| 6,715,039 | B1 * | 3/2004 | Michael | G06F 12/121 711/130 |
| 6,728,837 | B2 * | 4/2004 | Wilkes | G06F 12/122 711/133 |
| 6,732,242 | B2 * | 5/2004 | Hill | G06F 9/383 711/158 |
| 6,748,494 | B1 * | 6/2004 | Yashiro | G06F 12/127 711/133 |
| 6,795,894 | B1 * | 9/2004 | Neufeld | G06F 12/0866 711/113 |
| 6,829,698 | B2 * | 12/2004 | Arimilli | G06F 9/52 707/999.008 |
| 6,829,762 | B2 * | 12/2004 | Arimilli | G06F 12/1433 710/200 |
| 6,842,847 | B2 * | 1/2005 | Arimilli | G06F 12/084 707/999.008 |
| 6,851,024 | B1 | 2/2005 | Wilkes et al. | |
| 6,920,514 | B2 * | 7/2005 | Arimilli | G06F 9/52 710/200 |
| 6,925,551 | B2 * | 8/2005 | Arimilli | G06F 9/30054 710/200 |
| 7,017,031 | B2 * | 3/2006 | Arimilli | G06F 12/0811 710/200 |
| 7,213,005 | B2 * | 5/2007 | Mourad | G06F 17/3089 380/30 |
| 7,213,248 | B2 * | 5/2007 | Arimilli | G06F 9/52 710/200 |
| 7,644,239 | B2 * | 1/2010 | Ergan | G06F 3/061 711/118 |
| 7,856,530 | B1 * | 12/2010 | Mu | G06F 12/0888 711/119 |
| 8,438,339 | B2 * | 5/2013 | Krishna | G06F 12/0842 711/113 |
| 9,021,048 | B2 * | 4/2015 | Luna | H04L 67/22 709/213 |
| 9,092,156 | B1 * | 7/2015 | Xu | G06F 3/0659 |
| 2002/0010836 | A1 | 1/2002 | Barroso et al. | |
| 2002/0038391 | A1 * | 3/2002 | Ido | G06F 3/0611 710/6 |
| 2003/0101320 | A1 | 5/2003 | Chauvel et al. | |
| 2005/0091457 | A1 | 4/2005 | Auld et al. | |
| 2005/0097272 | A1 * | 5/2005 | Jiang | G06F 12/0868 711/114 |
| 2005/0172098 | A1 | 8/2005 | Worley | |
| 2006/0218349 | A1 * | 9/2006 | Oe | G06F 12/0866 711/118 |
| 2007/0011420 | A1 | 1/2007 | Boss et al. | |
| 2008/0256294 | A1 | 10/2008 | Gill | |
| 2010/0325352 | A1 | 12/2010 | Schuette et al. | |
| 2011/0099335 | A1 * | 4/2011 | Scott | G06F 12/0842 711/141 |
| 2011/0161589 | A1 | 6/2011 | Guthrie et al. | |
| 2012/0297113 | A1 | 11/2012 | Belluomini et al. | |
| 2012/0317312 | A1 * | 12/2012 | Elko | G06F 9/544 710/5 |
| 2013/0254462 | A1 | 9/2013 | Whyte | |
| 2014/0013053 | A1 * | 1/2014 | Sawin | G06F 12/0873 711/122 |
| 2014/0019650 | A1 | 1/2014 | Li et al. | |
| 2014/0082288 | A1 * | 3/2014 | Beard | G06F 17/30132 711/123 |
| 2014/0101370 | A1 | 4/2014 | Chu et al. | |
| 2014/0129779 | A1 * | 5/2014 | Frachtenberg | G06F 12/123 711/136 |
| 2014/0156935 | A1 | 6/2014 | Raikin et al. | |
| 2014/0223072 | A1 * | 8/2014 | Shivashankaraiah | G06F 12/0871 711/103 |
| 2015/0026403 | A1 * | 1/2015 | Ish | G06F 12/0868 711/118 |
| 2015/0178097 | A1 | 6/2015 | Russinovich | |
| 2015/0301931 | A1 | 10/2015 | Ahmad et al. | |
| 2015/0324294 | A1 | 11/2015 | Ogawa et al. | |
| 2015/0378953 | A1 | 12/2015 | Debbage et al. | |

OTHER PUBLICATIONS

Definition of Logical Unit Number (LUN); Technopedia; Jan. 13, 2012; retrieved from https://web.archive.org/web/20120113025245/http://www.techopedia.com/definition/321/logical-unit-number-lun on Dec. 4, 2015 (2 pages).*

Pointer Basics; Stanford CS Education Library; Feb. 14, 2012; retrieved from https://web.archive.org/web/20120214194251/http://cslibrary.stanford.edu/106 on Dec. 4, 2015 (1 page).*

Mlcache: a flexible multi-lateral cache simulator; Tam et al; Sixth International Symposium on Modeling, Analysis and Simulation of Computer and Telecommunication Systems; Jul. 19-24, 1998; pp. 19-26 (8 pages).*

EMC VSPEX With EMC XTREMSF and EMC XTREMSW Cache; EMC; May 2013; retrieved from http://www.emc.com/collateral/technical-documentation/h11704-vspex-xtremsf-xtremsw-cache-dg.pdf on Dec. 3, 2015 (84 pages).*

Introduction to EMC XTREMSW Cache; EMC; Aug. 2013; retrieved from https://web.archive.org/web/20131001125254/http://www.emc.com/collateral/white-papers/h11946-introduction-emc-xtremsw-cache-wp.pdf on Dec. 3, 2015 (33 pages).*

Michaud et al., "Methods and Apparatus for Memory Tier Page Cache with Zero File;" U.S. Appl. No. 14/501,112, filed Sep. 30, 2014; 28 Pages.

Michaud, "Methods and Apparatus for Direct Cache-Line Access to Attached Storage with Cache;" U.S. Appl. No. 14/318,939, filed Jun. 30, 2014; 16 Pages.

Clark et al., "Second Caches for Memory and Page Caches;" U.S. Appl. No. 14/564,420, filed Dec. 9, 2014; 21 Pages.

EMC Corporation, "Introduction to EMC Xtremecache," White Paper; Nov. 2013, 33 pages.

EMC Corporation, "EMC VSPEX with EMC XTREMSF and EMC Xtremcache," Design Guide; Dec. 2013, 95 pages.

U.S. Appl. No. 14/318,939 Office Action dated Jan. 21, 2016, 9 pages.

Response to Jan. 21, 2016 Office Action for U.S. Appl. No. 14/318,939, filed Apr. 14, 2016; 7 pages.

Response to U.S. Office Action dated Feb. 23, 2016 corresponding to U.S. Appl. No. 14/501,112; Response filed on Jun. 2, 2016; 10 Pages.

U.S. Appl. No. 14/318,939 Final Office Action dated Jul. 14, 2016, 11 pages.

Response to Final Office Action dated Jul. 14, 2016 corresponding to U.S. Appl. No. 14/318,939; Response filed on Oct. 5, 2016; 7 Pages.

Advisory Action dated Oct. 13, 2016 corresponding to U.S. Appl. No. 14/318,939; 3 Pages.

Supplemental Response to Final Office Action dated Jul. 14, 2016 corresponding to U.S. Appl. No. 14/318,939; Response filed on Oct. 14, 2016; 7 Pages.

Office Action dated Feb. 23, 2016; For U.S. Appl. No. 14/501,112; 24 pages.

U.S. Office Action dated Aug. 3, 2016 corresponding to U.S. Appl. No. 14/564,420; 31 Pages.

U.S. Appl. No. 14/501,112 Final Office Action dated Jul. 29, 2016, 33 pages.

* cited by examiner

PRIORITIZATION FOR CACHE SYSTEMS

BACKGROUND

As is known in the art, computer systems which process and store large amounts of data typically include one or more applications (e.g., server applications) in communication with a shared data storage system in which the data is stored. The data storage system (or "storage array") may include one or more storage devices, usually of a fairly robust nature and useful for storage spanning various temporal requirements, e.g., hard disk drives (HDDs). The applications perform their respective operations using the storage system. Storage systems typically include an array ("storage array") of a plurality of storage devices with on-board intelligent and communications electronics and software. Within a storage system, storage devices (or partitions therein) are commonly identified using logical unit numbers (LUNs).

To improve data read performance, it is known to use a caching system (or "caching tier") positioned between the applications and the storage array. The caching system may include large-capacity Flash media devices. Applications issue read and write (i.e., I/O) operations to the caching tier which, in turn, issues forwarded read and write operations to the storage array based upon the cache state and cache strategy. According to one cache strategy, data is "promoted" from a storage device in the storage array (referred to herein as a "source LUN") to the cache in the case of a read miss. According to another cache strategy, writes issued from the application result in data being written both to the source LUN and to the cache. To improve performance, cache promotions may be performed asynchronously.

SUMMARY

It is appreciated that the I/O throughput capacity, commonly expressed in terms of input/output operations per second (iops), of the storage array may exceed that of the cache (e.g., Flash media). In other words, source LUNs can complete read and write operations at a rate that is greater than the caching system's ability to write to flash and update cache state tables. This can result in the caching system's primary memory being exhausted. To avoid this condition, backlogged cache promotions may be skipped, resulting in indeterminate cache behavior.

In to one aspect, a method comprises receiving a first request to read first data; determining the first data is not available in a cache device (e.g., a PCIe Flash memory); requesting the first data from a first storage device; receiving a second request to read second data; determining the second data is not available in the cache device; requesting the second data from a second storage device; receiving the first data from the first storage device; receiving the second data from the second storage device; comparing a first priority level associated with the first storage device to a second priority level associated with the second storage device; and after receiving the first data and the second data, storing either the first data or the second data to the cache device based upon the comparing.

According to another aspect, a method comprises receiving a first request to write first data; writing the first data to a first storage device (e.g., a PCIe Flash memory); receiving a second request to write second data; writing the second data to a second storage device; comparing a first priority level associated with the first storage device to a second priority level associated with the second storage device; and storing either the first data or the second data to the cache device based upon the comparing.

In embodiments, one or more of the methods further comprise, in response to receiving the first data from the first storage device, allocating a first buffer in dynamic random access memory (DRAM) and copying the first data to the first buffer; and in response to receiving the second data from the second storage device, allocating a second buffer in DRAM and copying the second data to the second buffer. Copying the first and second data may be performed in a first computer processing thread and storing either the first data or the second data may be performed in a second computer processing thread. In some embodiments, one or more of the methods further comprises adding a first entry to a data structure, the first entry comprising a first storage locator to locate the first data in a storage array and a first buffer locator to locate the first buffer in DRAM; adding a second entry to the data structure, the second entry comprising a second storage locator to locate the second data in the storage array and a second buffer locator to locate the second buffer in DRAM; and removing either the first entry or the second entry from the data structure based upon the first priority level and the second priority level. The storage locators may comprise logical unit numbers (LUNs).

According to another aspect, a system comprises a plurality of logical storage devices identified by corresponding logical unit numbers (LUNs), each LUN having an associated priority level; a cache device; and a cache driver operatively coupled to intercept requests to read data requests from one or more applications, to forward the read data requests to ones of the plurality of logical storage devices, to determine which read data to promote to the caching device, and to prioritize the determined cache promotions based the LUN priority levels.

In some embodiments, the cache driver comprises a synchronous I/O module to synchronously add cache promotion information to a data structure and an asynchronous I/O module to asynchronously promote data to the cache device using the data structure. The cache driver may comprise a configuration module to assign the LUN priority levels. In embodiments, the cache driver is coupled to the plurality of storage devices via a Fibre Channel (FC).

BRIEF DESCRIPTION OF THE DRAWINGS

The systems and methods sought to be protected herein may be more fully understood from the following detailed description of the drawings, in which.

The drawings are not necessarily to scale, or inclusive of all elements of a system, emphasis instead generally being placed upon illustrating the systems and methods sought to be protected herein.

DETAILED DESCRIPTION

Before describing embodiments of the systems and methods sought to be protected herein, some terms are explained.

As used herein, the term "cache page" refers to the smallest unit of allocation inside a cache, typically a few kilobytes (KB) in size (e.g., 8 KB). The term "cache promotion" is used herein to refer to the process of promoting data (e.g., cache pages) into a cache after they have been referenced, or a change in the application access profile that begins to reference an earlier new set of data. As used herein, the term "working set" is used to describe a collection of information that is accessed frequently by an application over a period of time.

Before describing embodiments of the systems and methods sought to be protected herein, some terms are explained. The phrases "computer," "computing system," "computing environment," "processing platform," "data memory and storage system," and "data memory and storage system environment" as used herein with respect to various embodiments are intended to be broadly construed, so as to encompass, for example, private or public cloud computing or storage systems, or parts thereof, as well as other types of systems comprising distributed virtual infrastructure and those not comprising virtual infrastructure.

The terms "application," "program," "application program," and "computer application program" herein refer to any type of software application, including desktop applications, server applications, database applications, and mobile applications. The terms "application process" and "process" refer to an instance of an application that is being executed within a computing environment. As used herein, the terms "processing thread" and "thread" refer to a sequence of computer instructions which can execute concurrently (or in parallel) with one or more other such sequences.

The term "memory" herein refers to any type of computer memory accessed by an application using memory access programming semantics, including, by way of example, dynamic random access memory (DRAM) and memory-mapped files. Typically, reads or writes to underlying devices is done by an operating system (OS), not the application. As used herein, the term "storage" refers to any resource that is accessed by the application via input/output (I/O) device semantics such as read and write systems calls. In certain instances, the same physical hardware device could be accessed by the application as either memory or as storage.

Figure 1:
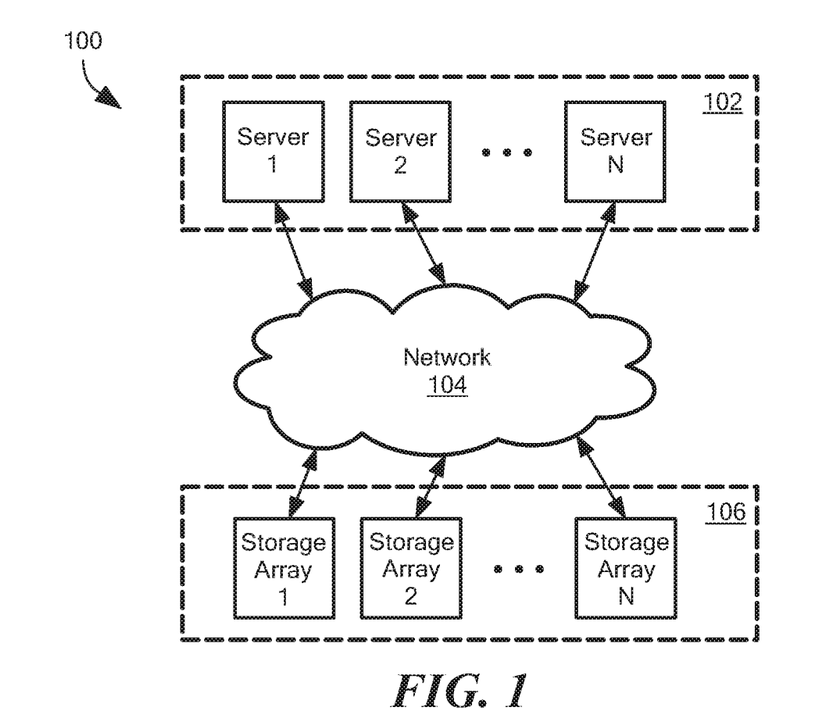
FIG. 1 is a network diagram of an illustrative data storage environment.

FIG. 1 shows an illustrative data storage environment 100 comprising one or more servers 102 operatively coupled to one or more storage arrays 106 via a network 104. The network 104 may be any known communication network or combination of networks including networks using protocols such as, but not limited to, Ethernet, Internet Small Computer System Interface (iSCSI), Fibre Channel (FC), wireless protocols, etc.

The servers 102 are hosts configured to execute applications, such as database applications, and may comprise off-the shelf server hardware and/or software (e.g., a Windows server, a Sun Solaris server, an HP server, a Linux server, etc.) A storage array 106, which may be a storage area network (SAN) array, comprises one or more physical and/or logical storage devices and may utilize storage products such as, by way of example, VNX and Symmetrix VMAX, both commercially available from EMC Corporation of Hopkinton, Mass. A variety of other storage products may be utilized to implement at least a portion of a storage array. In embodiments, the storage arrays 106 utilize fully automated storage tiering (FAST) technology from EMC Corporation. As is known, FAST technology helps place the application data in the right storage tier based on the frequency with which data is being accessed.

In general operation, a server 102 executes an application which issues data read and write requests ("commands") to a storage array 106. The storage array 106 is configured with storage resources (e.g., disk drives) used to store backend data files. The storage array 106 processes read and write commands received from the application host and, in the case of a read request, sends data stored thereon back to the requesting server 102.

Figure 2:
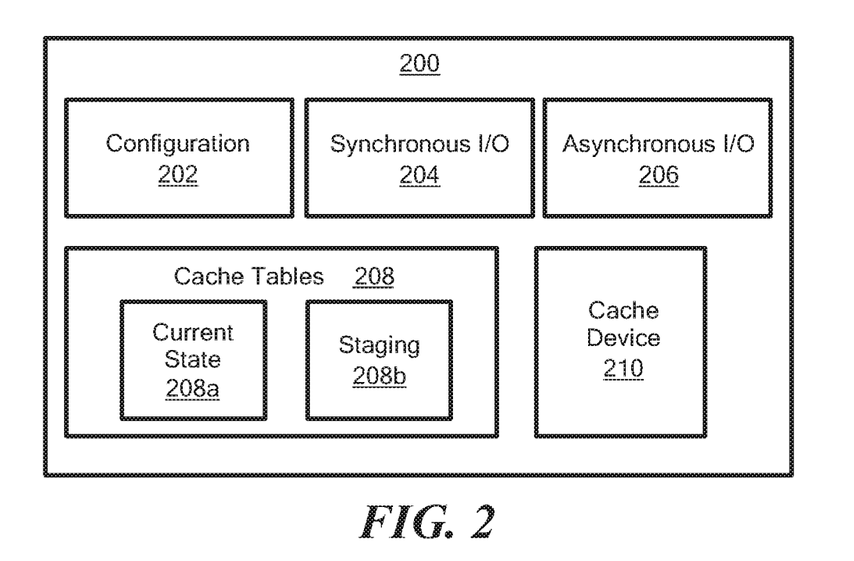
FIG. 2 is a block diagram of an illustrative caching system.

FIG. 2 shows an illustrative caching system 200 for use in a data storage environment (e.g., within a server 102 of FIG. 1). The caching system 200 comprises a configuration module 202, a synchronous I/O module 204, and an asynchronous I/O module 206. These modules comprise hardware and/or software configured to perform processing described herein below. The caching system 200 further comprises cache tables 208 and a cache device 210, such as a NAND-based Flash memory. In embodiments, the cache device 210 is provided on a PCIe card.

The configuration module 202 manages the caching system's configuration, which may be stored within volatile memory (e.g., DRAM) and/or non-volatile memory (e.g., Flash memory). In embodiments, the caching system 200 comprises a non-volatile memory having a first partition to store cached data (i.e., one or more of the partitions corresponds to the cache device 210) and a second partition to store configuration information and/or temporary data. The configuration module enables administrators to configure (or "optimize") the data storage system to improve performance. For example, a user may assign a cache priority level per backend storage device and/or per application. Such configuration may be based on previously application usage. For example, if an application is known to access a particular data set (i.e., its working set is known), an administrator can assign a high priority level to the source storage devices for that data set. In embodiments, the caching system includes an application programming interface (API) to allow programmatic cache configuration.

The I/O modules 204, 206 manage the contents of the cache device 210 according to a defined caching policy. The synchronous I/O module 204 receives (or "intercepts") data read and write requests from an application and processes those requests in a synchronous manner (e.g., the application may block on such processing). To reduce the delay in handling application I/O requests, processing which can be delayed (e.g., de-staging writes to the cache device 210) is performed asynchronously by the asynchronous I/O module 206. Specific examples of synchronous and asynchronous cache processing are described below in connection with FIG. 3. In some embodiments, the synchronous and asynchronous I/O modules can execute in parallel using multi-threading, multiple OS-level processes with inter-process communication (IPC), or any other suitable parallel processing techniques.

The cache tables 208 comprise one or more data structures to represent the state of the cache system. The cache tables may include, for example, a current state table 208a that includes information about the current state of the cache 210, and a staging table 208b that includes pending cache promotion information. It will be understood that the term "table" is not meant to be limiting and that any suitable data structures can be used to represent the cache state, including hash tables, linked lists, queues, priority queues, etc. The cache tables 208 may be stored in volatile memory (e.g., DRAM) and/or non-volatile memory (e.g., Flash). The I/O modules 204, 206 access and modify to the cache tables in the course of the processing described below. In embodiments, the synchronous I/O module 204 and the asynchronous module 206 execute on separate processing threads and access the cache tables 208 using a thread-safe mechanism, such as a mutual exclusion mechanism (i.e., a "mutex").

Figure 3:
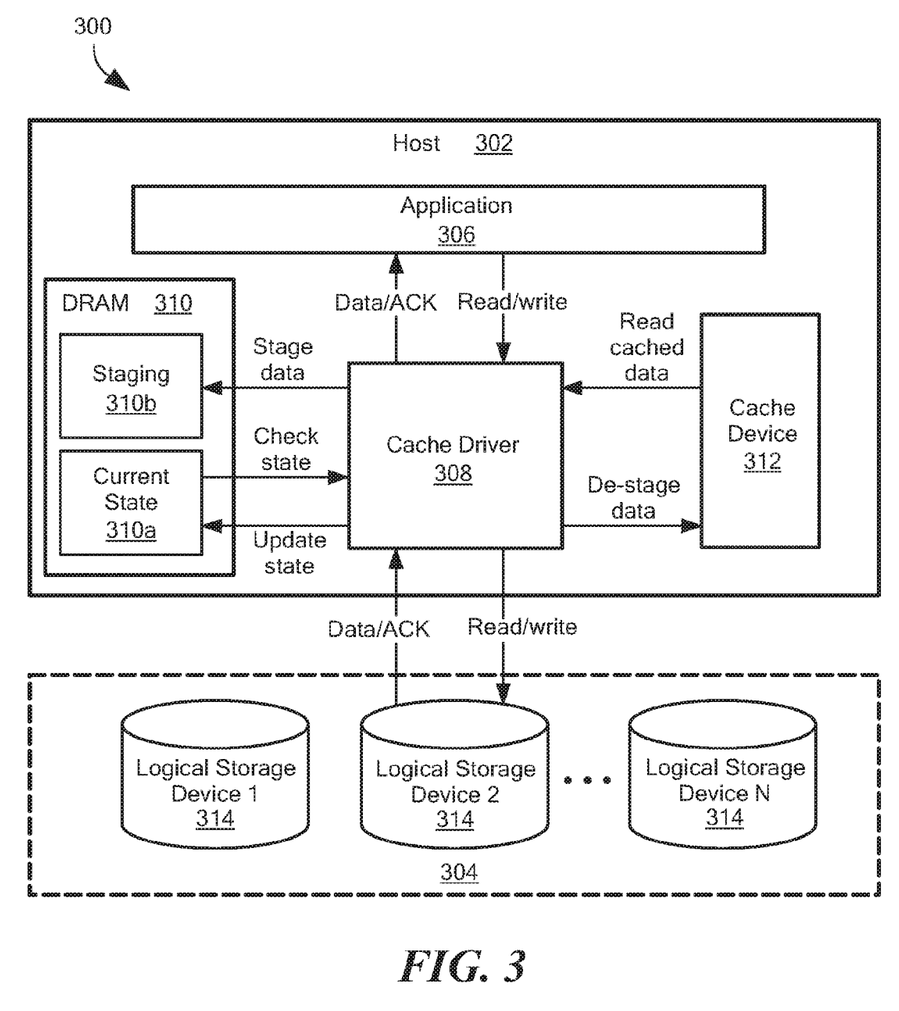
FIG. 3 is a block diagram of an illustrative data storage environment including a cache system.

FIG. 3 shows an illustrative data storage environment 300 comprising a host 302 operatively coupled to a storage array 304 (sometimes referred to as the "back-end storage"). In embodiments, the host 302 and storage array 304 are coupled via a network 104 (FIG. 1). The illustrative host 302, which may be the same as or similar to one of the servers 102 of FIG. 1, comprises one or more applications 306 (for clarity, only one application is show), a cache driver 308, DRAM 310, and a cache device 312. The DRAM 310 comprises one or more cache tables such as the current state table 310a and the staging table 310b. The cache driver 308, the cache device 312, and the caching tables 310a, 310b are collectively referred to as a caching system, which may be the same as or similar to the system 200 of FIG. 2. The cache device 312 may be the same as or similar to the cache device 210 of FIG. 2.

In some embodiments, the application 306 is located on separate physical and/or logical hosts from the caching system (e.g., caching may occur within the storage array 304). However, it is appreciated that collocating the application 306 and caching system may be advantageous because such a setup avoids latency associated with data traversing the network to access the data.

The cache driver 308 comprises hardware and/or software components configured to perform processing described herein below (see FIGS. 5A-5C, for example). In embodiments, the cache driver 308 is provided as one or more libraries. The libraries may be grouped into one or more modules such as the modules shown in FIG. 2. In some embodiments, the cache driver 308 comprises a library that includes I/O functions (e.g., "read" and "write"). In some embodiments, the cache driver 308 transparently "intercepts" I/O function calls issued by the application 306 such that the application is generally unaware of cache driver's intervention. Any techniques known to those skilled in the art may be used to intercept the application I/O function calls. For example, many operating systems (OS) allow function interposition using shared libraries whereby the shared library is preloaded with an application and function implementations therein are given priority over system function implementations. Thus, in some embodiments, the cache driver 308 comprises I/O function names and/or signatures which match those used by the standard I/O system libraries (e.g., the Standard C Library).

Alternatively, the cache driver 308 may comprise a library that is dynamically loadable into the OS's runtime to intercept I/O function calls at the kernel level. For example, the cache driver 308 may include a Linux kernel loadable. In embodiments, the cache driver includes instructions configured to be executed within "kernel space" and instructions configured to be executed within "user space" (i.e., outside the kernel). In some embodiments, the synchronous I/O module 204 executes in kernel space, whereas other modules (e.g., the asynchronous I/O module 206) execute in user space. The kernel space modules can communicate with the user space modules using any suitable inter-process communication (IPC) techniques, including shared memory, pipes, files, sockets, etc.

An illustrative storage array 304, which may be the same or similar to one of the storage arrays 106 shown in FIG. 1, includes a plurality of logical storage devices 314. The storage array 304 further includes one or more physical storage devices (not shown) and a given logical storage device 314 corresponds to an identified portion of the physical storage devices (i.e., a logical device is mapped to physical devices). The physical storage devices may include RAID disks. In embodiments, the storage array 304 comprises (or is part of) a SAN array operatively coupled to the host 302 via a Fibre Channel (FC) network using the iSCSI protocol. The physical storage devices may correspond to physical SCSI devices (or "targets") and the logical storage devices 314 may be individually addressable using logical unit numbers (LUNs). Thus, a LUN corresponds to some portion of one or more physical disks exposed to the host 302 as a block level data storage device. In embodiments, the mapping between LUNs and disks is dynamically managed by the storage array 304 (e.g., the storage array may be capable of relocating/balancing data to improve performance, improve reliability, reduce power consumption etc.). The host 302 (or an OS thereon) maintains one or more networked filesystems corresponding to one or more LUNs and, thus, the applications 306 can read and write data to the storage array 304 using standard filesystem operations.

Figure 4A:
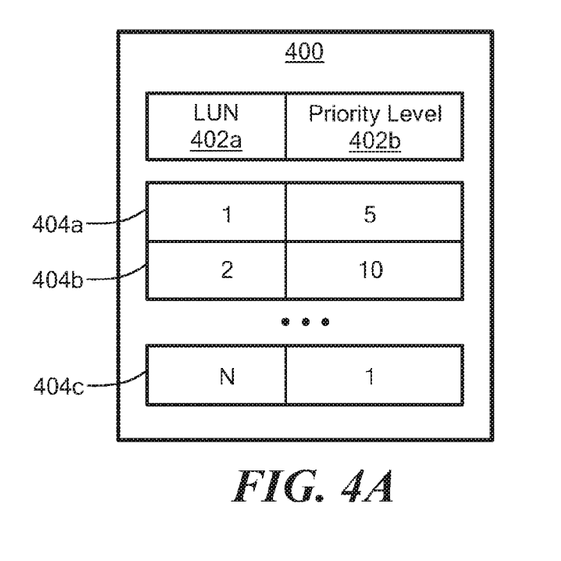
FIGS. 4A and 4B are diagrams of an illustrative data structures for use within a caching system.

The host 302 maintains a priority level for one or more of the logical storage devices 314. A logical storage device 312 may have an explicit priority level (e.g., a value configured by a user or an application) or a default value. In embodiments, the host 302 maintains a table mapping LUNs to priority levels, as shown in FIG. 4A and described below in connection therewith. The mapping table may be maintained by the configuration module 202 of FIG. 1 and stored volatile memory (e.g., DRAM 310) and/or within non-volatile memory (e.g., within the device 312).

Turning to FIG. 4A, an illustrative priority level table 400 associates priority levels to logical storage devices. The table 300 comprises a LUN column 402a, a priority level column 402b, and rows 404a-404n. A row 404 indicates the priority level for a particular logical storage device, identified by a LUN. In some embodiments, the table 400 is maintained and used by the caching system 200 of FIG. 2; in particular, the table 300 may be updated by the configuration module 202 and accessed by the asynchronous I/O module 206 to prioritize pending cache promotions. It is understood that the data structure 400 is merely illustrative and that any suitable data structure may be used to maintain priority levels within caching systems described herein.

Figure 4B:
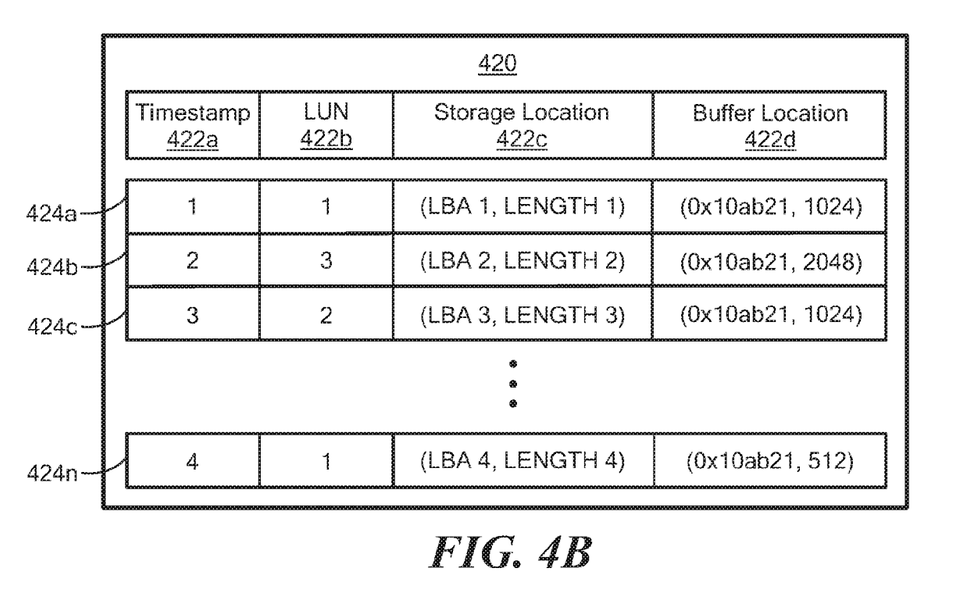

Turning to FIG. 4B, an illustrative staging table 420, which may be the same as or similar to the staging table 310b of FIG. 3, represents pending cache promotions within a caching system. The staging table 420 comprises a time-stamp column 422a, a LUN column 422b, a storage location column 422c, a buffer location column 422d, and rows 424a-424n.

A row 424 represents a pending cache promotion and includes one or more values, described herein with reference to corresponding table columns. A timestamp 422a indicates the time the cache promotion was staged and may be used, for example, to identify more recently staged cache promotions. A LUN 422b identifies the logical storage device wherein the to-be-promoted data is stored (i.e., the source storage device). A storage location 422c represents the location of the data within the logical storage device. In some embodiments the logical storage device is a block device (e.g., a SCSI device) and the storage location 422c comprises a logical block address (LBA) and a transfer length, as shown. In embodiments, the storage location 422c also includes the LUN and, therefore, the LUN column 422b may be omitted. The LUN and the LBA may be used to uniquely identify the data within the cache (e.g., it may be used to generate a cache index). In another embodiment, the staging table 420 includes a cache key column and the storage location 422c is omitted. A buffer location 422d represents to the location of the buffer allocated to temporarily store the data to be promoted to cache. In embodiments, the buffer location 422d comprises a virtual/physical memory address and corresponding length, as shown. In some embodiments, the buffer location 422d comprises a count of fixed-size memory pages.

In some embodiments, the synchronous I/O module 204 adds rows to the table 420 and the asynchronous I/O module 206 accesses, updates, and/or removes rows from the table 420. In some embodiments, the staging table 420 is protected by a thread-safe mechanism such that the multiple threads can read/write to the table in parallel. It is understood that the table structure 420 is merely illustrative and that any suitable data structure may be used to track pending cache writes.

Referring again to FIG. 3, in general operation, the application 306 generates data read requests and data write requests, which are intercepted by the cache driver 308. In embodiments, the application 306 indirectly generates read and write requests by interfacing with a filesystem upon the host (e.g., using file operations provided by the host's OS). A read request includes the location of the requested data within the storage array (i.e. a storage location) and a write request comprises a storage location along with the data to be written. The cache driver 308 processes the request locally and/or forwards the request to the storage array 304. The application 306 may block on a response to the read/write request and, thus, the any delays in processing the read/write request can adversely affect the application's performance.

In response to receiving a read/write request, the caching driver 308 may make a determination whether to promote the read/written data to cache. Promoting data to cache involves writing to the cache device 312, which may result in a considerable delay. To reduce the time the application may block on the read/write request, the caching driver 308 synchronously stages the promotion and asynchronously de-stages (i.e., performs) the promotion. Illustrative methods for processing a read request, processing a write request, intercepting a write request, and de-staging promotions are show in FIGS. 5A, 5B, and 5C, respectively, and described below in connection therewith.

Figure 5A:
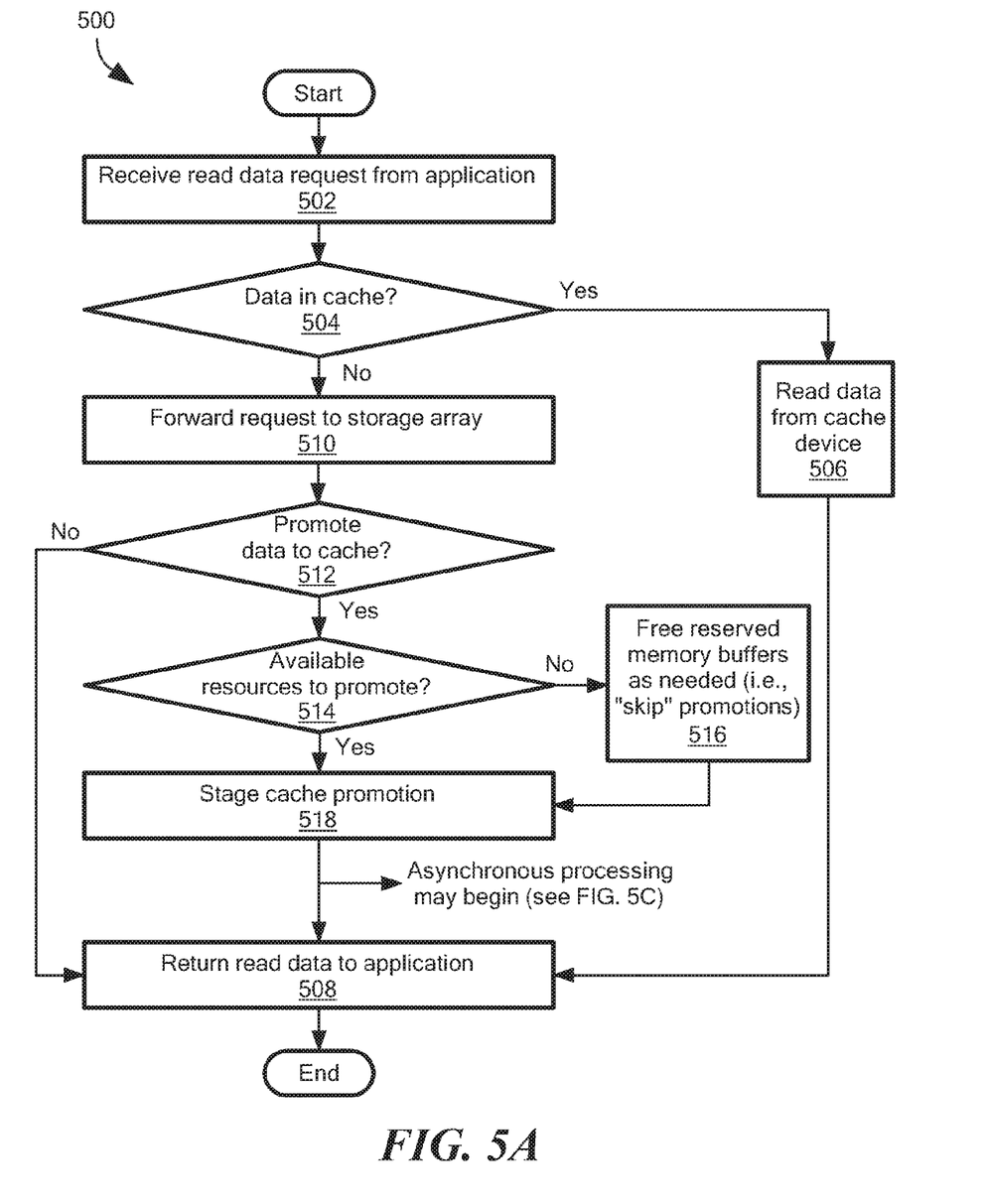
FIGS. 5A-5C are flowcharts of an illustrative methods for use within a caching system.
Figure 5B:
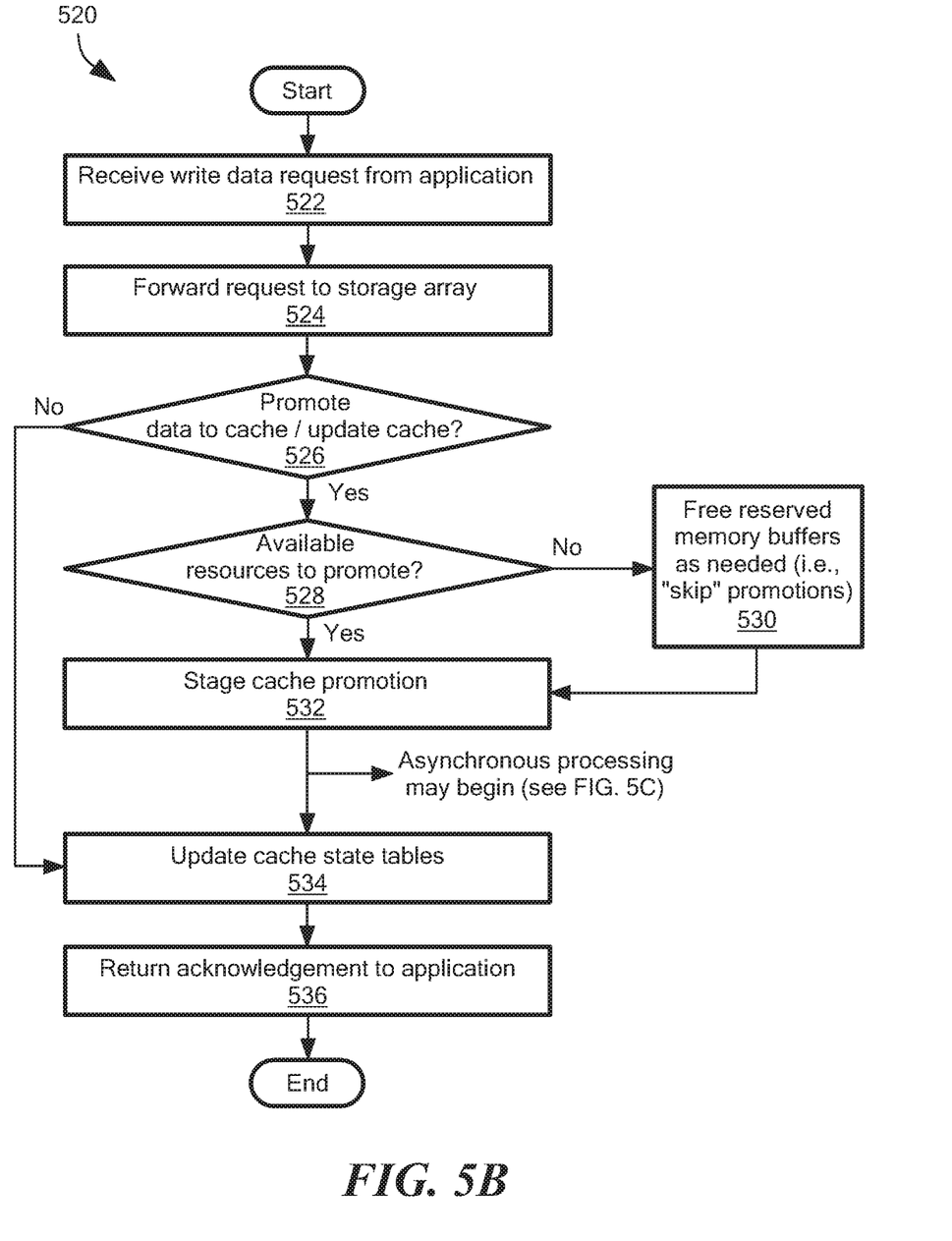
Figure 5C:
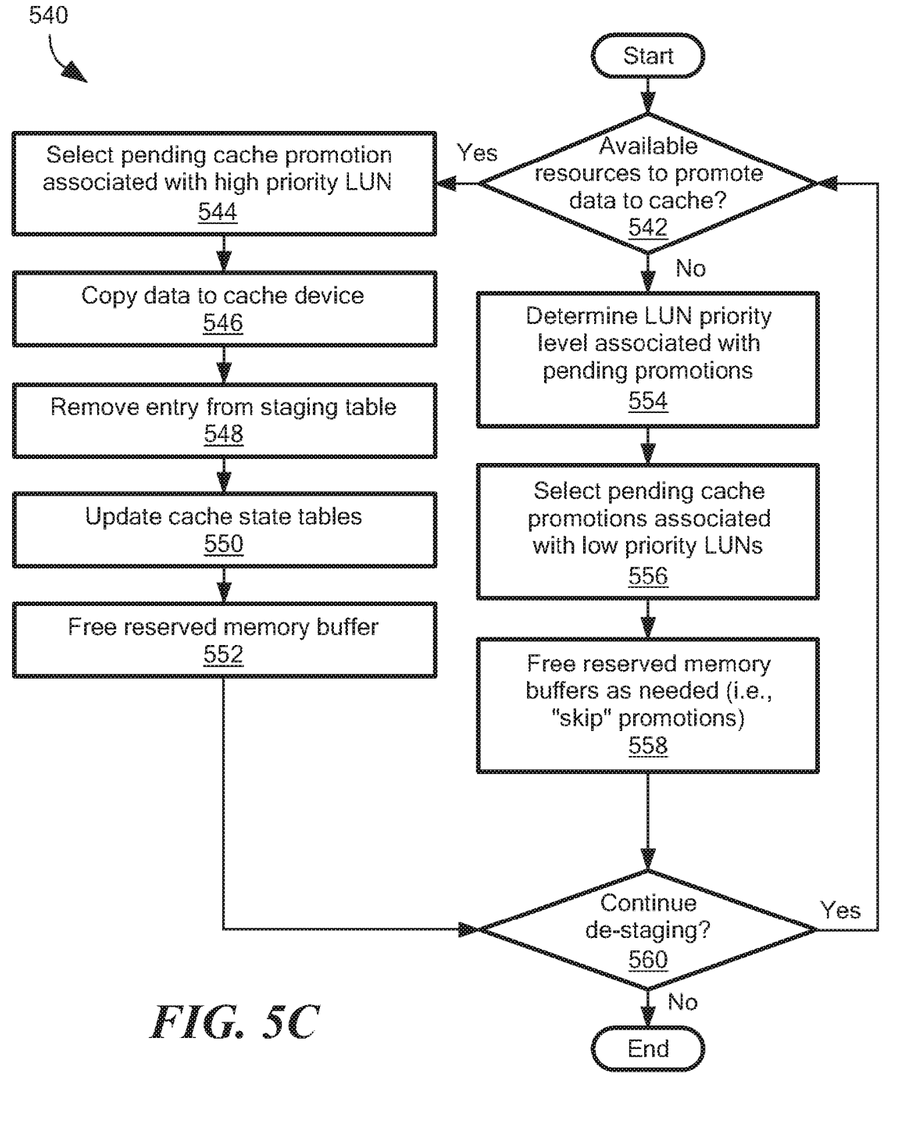

FIGS. 5A-5C are flowcharts corresponding to the below contemplated technique which may be implemented in a caching system (e.g., caching system 200 of FIG. 2). Rectangular elements (typified by element 502 in FIG. 5A), herein denoted "processing blocks," represent computer software instructions or groups of instructions. Diamond shaped elements (typified by element 504 in FIG. 5A), herein denoted "decision blocks," represent computer software instructions, or groups of instructions, which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language but rather illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the systems and methods sought to be protected herein. Thus, unless otherwise stated the blocks described below are unordered meaning that, when possible, the functions represented by the blocks can be performed in any convenient or desirable order.

In the following descriptions of FIGS. 5A-5C, like elements of FIGS. 2 and 3 are shown having like reference designations.

Referring to FIG. 5A, an illustrative method 500 may correspond to processing performed within the caching driver 308 when intercepting a data read request. In embodiments, the synchronous I/O module 204 is configured to perform the method 500. At block 502, a request to read data is received from an application 306 and, at block 504, a determination is made whether the requested data is available within the cache (i.e., within the cache device 312). In this context, "available" means that the requested data exists in the cache and that the cached data is consistent with the source storage device. In embodiments, this determination is based on the current state table 310a. In some embodiments, cache driver 308 derives a cache key (e.g., from a LUN and a LBA specified in the read request) used to index into the current state table 310a.

If the requested data is available in the cache (i.e., a "read hit"), processing continues to block 506, where the data is read from the cache device 312 and, at block 508, the cached data is returned to the application 306. Thus, in this case, the read request is processed entirely within the host 302 and the cost (e.g., latency) of reading data from the storage array 304 is not incurred.

If the data is not available in the cache (i.e., a "read miss"), processing continues to block 510, where the read request is forwarded to a storage array 304 (i.e., a logical storage device 314 identified by a LUN). At block 512, after the data is read from the storage array 304, a determination is made whether to promote the requested data to cache (i.e., to add the read data to cache). This determination may be based on the cache strategy. In embodiments, the cache driver 308 uses a FAST algorithm to intelligently determine which data is the "hottest" and to cache an application's working set within the cache (ideally, entirely within the cache). This determination could also be based upon the LUN priority level.

To reduce the time the application may block on the read request, cache promotions may be performed asynchronous to the read request, meaning that the application does not block on writes to the cache device. In general, I/O data is synchronously staged by copying it to an allocated DRAM buffer, and asynchronously de-staged from DRAM to the cache device. Because DRAM is a limited resource and the cache driver may support many applications, it is generally not possible to stage all I/O data. Thus, at block 514, a determination is made whether sufficient resources are available to stage the cache promotion. For example, the cache driver may allocate a certain number of DRAM buffers to reserve and save I/O data and, at block 514, the cache driver determines if any such buffers are available. If sufficient resources are not available, the cache driver may, at block 516, free one or more reserved memory buffers (i.e., "skip" one or more pending promotions). Here, freeing memory may involve de-allocating reserved memory, zeroing/clearing out such memory, and/or marking such memory as available. In embodiments, the cache driver clears buffers corresponding to LUNs having a lower priority that the current request LUN. Alternatively, if sufficiently resources are not available, the cache driver does not promote the request data. In some embodiments, block 516 is omitted and, as described below in connection with FIG. 5C, the asynchronous I/O module is responsible for freeing reserved memory buffers.

If the data is to be promoted and sufficient resources are available to do so, processing continues to block 518 where the cache promotion is "staged." Staging generally includes (1) allocating an application-specific DRAM buffer; (2) copying the read data thereto; and (3) adding the promotion to a list of pending promotions. In some embodiments, the list of pending promotions comprises a table, such as the illustrative staging table 310b; however, any suitable data structure may be used, including a queue, a priority queue, a linked list, etc. The staged cache promotion is associated with a source LUN, which in turn is associated with a priority level.

After the cache promotion is staged, it can be processed (i.e., "de-staged") asynchronous as shown in FIG. 5C and described below. However, it should be understood that some or all of the processing shown in FIG. 5C may be performed synchronous the application read request.

Referring to FIG. 5B, an illustrative method 520 may correspond to processing performed within the caching driver 308 when intercepting a data write request. In embodiments, the synchronous I/O module 204 is configured to perform the method 520. At block 522, a data write request is received from the application 306 and, at block 524, the request is forwarded to the storage array 304 (i.e., a logical storage device 314 identified by a LUN). Thus, it is understood that cache driver 308 uses a write-through process, ensuring that newly written data persists to the backend storage array.

At block 526, a determination is made whether to promote the write data to cache; in this context, the term "promote" means to write the data to cache, regardless of whether an earlier version of the data currently exists in cache (i.e., a "write hit") or not (i.e., a "write miss"). This determination may be based on the cache strategy. For example, in embodiments, the cache driver 308 may be configured to promote data to the cache in the case of a "write hit" but not in the case of a "write miss." Such cache strategy may be configured by a user and/or an application on a per-request basis and/or as default behavior. This determination could also be based upon a FAST algorithm and/or the LUN priority level.

If it is determined to promote/update the data, at block 528, another determination is made whether sufficient resources are available to stage the cache promotion. If sufficient resources are not available, processing continues to block 530 (or, alternatively, to block 534). If resources are available, processing continues to block 532. The processing of blocks 528, 530, and 532 may be the same as or similar to that of blocks 514, 516, and 518 of FIG. 5A, respectively. In embodiments, processing block 530 is omitted.

After the cache promotion/update is staged, it can be processed (i.e., "de-staged") asynchronous as shown in FIG. 5C and described below. However, it should be understood that some or all of the processing shown in FIG. 5C may be performed synchronous the application read request.

At block 534, regardless of whether the write data is promoted to cache, cache state tables are updated if necessary. For example, if an older version of the write data is present in the cache, it is necessary to synchronously update the cache table to mark such data as unavailable/invalid (i.e., "dirty"). At block 536, the synchronous request processing is complete and an acknowledgement is returned to the application.

Referring to FIG. 5C, an illustrative method 540 may correspond to processing performed within the caching driver 308 (FIG. 3) when de-staging cache promotions. In embodiments, the asynchronous I/O module 206 (FIG. 2) is configured to perform the method 540; thus, it is understood that, within a caching driver, the method 540 may be performed in parallel with method 500 or FIG. 5A and/or method 520 of FIG. 5B.

It is understood that the aggregate I/O performance of the storage array may exceed that of the cache device 312 and, therefore, the rate at which promotions are staged can exceed the rate at which they are de-staged, making it necessary to skip promotions. Essentially, outstanding cache promotions (data in the allocated DRAM buffers) can only be de-staged to the cache device at a rate limited by the capability of the cache device. Because DRAM an exhaustible resource, the caching system is required to limit the size of DRAM it can reserve. If the inflow of pending promotions exceeds the outflow of completed promotions, the caching system must necessarily skip pending promotions and free up DRAM, either due to system application requirements or to accommodate promotions. In general, it cannot be determined which cache promotions, corresponding to which LUNs, will be skipped.

Accordingly, at block 542, a determination is made whether there are sufficient resources to promote data to cache. This determination may be based upon available system resources (e.g., memory).

If sufficient resources are available, at block 544, one or more pending cache promotions are selected. In embodiments, this selection is based upon the LUN priorities associated with the pending cache promotions and/or based upon the timestamps 422a (FIG. 4B) of the pending promotions (e.g., a higher priority/newer promotion is selected over a lower priority/older promotion). It is appreciated that this approach may reduce the likelihood that promotions corresponding to a high-priority LUN are skipped, thus providing more predictable application performance. In embodiments, the processing of block 544 includes joining table 400 (FIG. 4A) and table 420 (FIG. 4B).

At blocks 546-552, the selected cache promotion (or promotions) is de-staged as follows. At block 546, the I/O data is copied from the corresponding DRAM buffer to the cache device. At block 548, and the corresponding staging table entry is removed (or otherwise marked as completed). At block 550, the cache state tables are updated to reflect the new data in cache. At block 552, the reserved memory (e.g., DRAM) buffer associated with the selected promotions is freed (i.e., de-allocated or cleared).

If, at block 542, it is determined that resources are not available, processing proceeds to block 554 where the LUN priority level of the pending promotions is determined. At block 556, one or more pending cache promotions associated with low priority LUNs are selected to be skipped. At block 558, reserved memory buffers associated with the selected cache promotions are freed (e.g., de-allocated or cleared); the staging table may also be updated. It is understood that, by skipping cache promotions associated with lower priority LUNs, the more predictable application performance can be achieved.

The processing of blocks 542-558 may be repeated indefinitely or until (at block 560) a determination is made to halt processing.

If sufficient resources are not available to promote data to cache, at block 560 one or more reserved memory buffers are freed. In embodiments, the cache driver clears buffers corresponding to LUNs having a lower priority that the current request LUN. Thus, it is more likely that cache promotions associated with higher priority LUNs will be completed compared to cache promotions associated with lower priority LUNs.

It should be appreciated that the caching system improves existing asynchronous cache update functionality using additional information to prioritize the de-staging of data from host memory. By associating a priority level with source LUNs being cached, it is possible to control which cache promotions are more or less likely to be skipped in the event of host memory exhausting.

Figure 6:
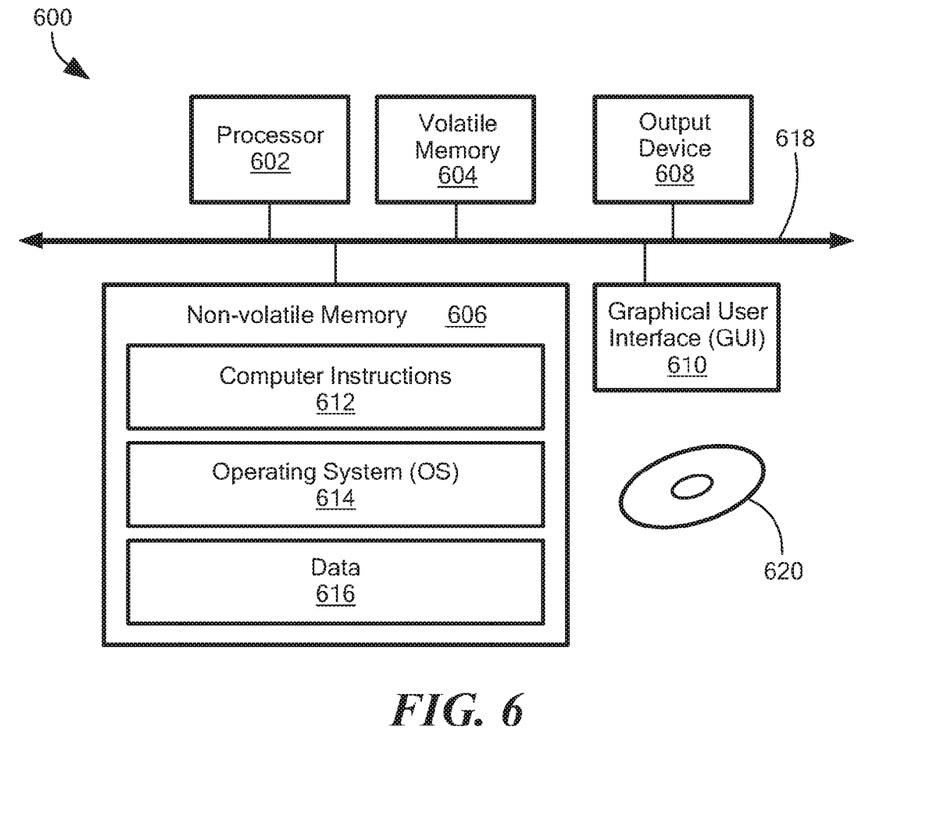
FIG. 6 is a schematic representation of a computer for use with a caching system.

FIG. 6 shows an exemplary computer or other processing device 600 that can perform at least part of the processing described herein. The computer 600 includes a processor 602, a volatile memory 604, a non-volatile memory 606 (e.g., hard disk), an output device 608 and a graphical user interface (GUI) 610 (e.g., a mouse, a keyboard, a display, for example), each of which is coupled together by a bus 618. The non-volatile memory 606 stores computer instructions 612, an operating system 614, and data 616. In one example, the computer instructions 612 are executed by the processor 602 out of volatile memory 604. In one embodiment, an article 620 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate. Processing may be performed by one or more programmable processors executing one or more computer programs to perform the functions of the system. All or part of the system may be implemented as special purpose logic circuitry (e.g., an FPGA (field programmable gate array) and/or an ASIC (application-specific integrated circuit)).

All references cited herein are hereby incorporated herein by reference in their entirety.

A non-transitory machine-readable medium may include but is not limited to a hard drive, compact disc, flash memory, non-volatile memory, volatile memory, magnetic diskette and so forth but does not include a transitory signal per se.

Having described certain embodiments, which serve to illustrate various systems and methods sought to be protected herein, it will now become apparent to those of ordinary skill in the art that other embodiments incorporating these concepts, structures, and techniques may be used. Accordingly, it is submitted that that scope of the patent should not be limited to the described embodiments but rather should be limited only by the spirit and scope of the following claims.

What is claimed is:

1. A method comprising:
    receiving a first request to read first data;
    determining the first data is not available in a cache device;
    requesting the first data from a first storage device;
    determining to promote the first data to cache based at least in part upon a first priority level associated with the first storage device;
    copying the first data received from the first storage device to a cache promotion staging data structure, the cache promotion staging data structure comprising information about pending cache promotions;
    receiving a second request to read second data;
    determining the second data is not available in the cache device;
    requesting the second data from a second storage device;
    determining to promote the second data to cache based at least in part upon a second priority level associated with the second storage device;
    determining there are insufficient resources to copy the second data to the cache promotion staging data structure;
    determining to replace the first data in the cache promotion staging data structure with the second data based at least in part upon comparing the first priority level associated with the first storage device to the second priority level associated with the second storage device;
    replacing, in the cache promotion staging data structure, the first data with the second data received from the second storage device, wherein replacing the first data in the cache promotion staging data structure causes the first data not to be moved to the cache device; and
    moving the second data from the cache promotion staging data structure to the cache device.

2. The method of claim 1 wherein copying the first data received from the first storage device to the cache promotion staging data structure comprises allocating a first buffer in dynamic random access memory (DRAM) and copying the first data to the first buffer.

3. The method of claim 1 wherein copying the first data received from the first storage device is performed in a first processing thread and moving the second data from the cache promotion staging data structure to the cache device is performed in a second processing thread.

4. The method of claim 2 wherein replacing, in the cache promotion staging data structure, the first data with the second data received from the second storage device comprises de-allocating the first buffer in DRAM, allocating a second buffer in DRAM, and copying the second data to the second buffer.

5. The method of claim 4 wherein the first storage locator and the second storage locator comprise logical unit numbers (LUNs).

6. The method of claim 3 further comprising employing a mechanism to provide thread safe access to the data structure.

7. The method of claim 1 further comprising receiving a configuration request to set a priority level, the configuration request comprising a storage device identifier and a priority level.

8. The method of claim 1 wherein the cache device comprises Peripheral Component Interconnect Express (PCIe) Flash memory.

9. A method comprising:
receiving a first request to write first data;
writing the first data to a first storage device;
determining to promote the first data to a cache device based at least in part upon a first priority level associated with the first storage device;
copying the first data to a cache promotion staging data structure, the cache promotion staging data structure comprising information about pending cache promotions;
receiving a second request to write second data;
writing the second data to a second storage device;
determining to promote the second data to the cache device based at least in part upon a second priority level associated with the second storage device;
determining there are insufficient resources to copy the second data to the cache promotion staging data structure;
determining to replace the first data in the cache promotion staging data structure with the second data based at least in part upon comparing the first priority level associated with the first storage device to the second priority level associated with the second storage device;
replacing, in the cache promotion staging data structure, the first data with the second data, wherein replacing the first data in the cache promotion staging data structure causes the first data not to be moved to the cache device; and
moving the second data from the cache promotion staging data structure to the cache device.

10. The method of claim 9 wherein copying the first data to the cache promotion staging data structure comprises allocating a first buffer in dynamic random access memory (DRAM) and copying the first data to the first buffer.

11. The method of claim 9 wherein copying the first data is performed in a first processing thread and moving the second data from the cache promotion staging data structure to the cache device is performed in a second processing thread.

12. The method of claim 10 wherein replacing, in the cache promotion staging data structure, the first data with the second data comprises de-allocating the first buffer in DRAM, allocating a second buffer in DRAM, and copying the second data to the second buffer.

13. The method of claim 12 wherein the first storage locator and the second storage locator comprise logical unit numbers (LUNs).

14. A system comprising:
a plurality of logical storage devices identified by corresponding logical unit numbers (LUNs), each LUN having an associated priority level;
a cache device; and
a cache driver configured to:
receive a first request to read first data;
determine the first data is not available in the cache device;
request the first data from a first storage device from the plurality of logical storage devices;
determine to promote the first data to cache based at least in part upon a first priority level associated with the first storage device;
copy the first data received from the first storage device to a cache promotion staging data structure, the cache promotion staging data structure comprising information about pending cache promotions;
receive a second request to read second data;
determine the second data is not available in the cache device;
request the second data from a second storage device from the plurality of logical storage devices;
determine to promote the second data to cache based at least in part upon a second priority level associated with the second storage device;
determine there are insufficient resources to copy the second data to the cache promotion staging data structure;
determine to replace the first data in the cache promotion staging data structure with the second data based at least in part upon comparing the first priority level associated with the first storage device to the second priority level associated with the second storage device;
replace, in the cache promotion staging data structure, the first data with the second data received from the second storage device, wherein replacing the first data in the cache promotion staging data structure causes the first data not to be moved to the cache device; and
move the second data from the cache promotion staging data structure to the cache device.

15. The system of claim 14 wherein the cache driver comprises a synchronous input/output (I/O) module to synchronously copy data to the cache promotion staging data structure and an asynchronous I/O module to asynchronously move data from the cache promotion staging data structure to the cache device.

16. The system of claim 14 wherein the cache driver comprises a configuration module to assign the LUN priority levels.

17. The system of claim 14 wherein the cache driver is coupled to at least one of the plurality of storage devices via a Fibre Channel (FC).

* * * * *